United States Patent [19]

Gyi et al.

[11] 4,118,746
[45] Oct. 3, 1978

[54] HIGH PERFORMANCE FLOPPY PACK AND ASSOCIATED SYSTEM

[75] Inventors: Ko Ko Gyi; Herbert Underwood Ragle, both of Thousand Oaks, Calif.

[73] Assignee: Burroughs Corporation, Detroit, Mich.

[21] Appl. No.: 774,312

[22] Filed: Mar. 4, 1977

[51] Int. Cl.² .................... G11B 5/012; G11B 25/04; G11B 21/08
[52] U.S. Cl. ..................................... 360/99; 346/137; 360/98
[58] Field of Search .................... 360/97–99, 360/133, 135, 105; 346/137

[56] References Cited

U.S. PATENT DOCUMENTS

| 3,768,083 | 10/1973 | Pejcha | 360/98 |
| 3,936,880 | 2/1976 | McGinnis et al. | 360/99 |
| 3,947,885 | 3/1976 | McGinnis et al. | 360/98 |
| 3,994,017 | 11/1976 | Barkhuff et al. | 360/99 |
| 4,011,591 | 3/1977 | Orlando et al. | 360/99 |
| 4,019,204 | 4/1977 | Griffiths et al. | 360/99 |

OTHER PUBLICATIONS

IBM Tech. Disc. Bulletin, G.D. Herring et al., Adjustable Flexible Disc Assembly, vol. 17, No. 6, Nov. 1974, pp. 1710–1711

*Primary Examiner*—Alfred H. Eddleman
*Attorney, Agent, or Firm*—John J. McCormack; Nathan Cass; Kevin R. Peterson

[57] ABSTRACT

Improved flexible disk magnetic storage systems and associated sub-assemblies and media are illustrated in the embodiments as comprising a pack of flexible magnetic recording disks stacked for co-rotation at high rpm on a manipulator assembly which includes a pneumatic separator-hub adapted to be shifted axially along the disk array so as to direct an air jet between selected disks and thus "partition" the stack for entry of a transducer assembly.

2 Claims, 10 Drawing Figures

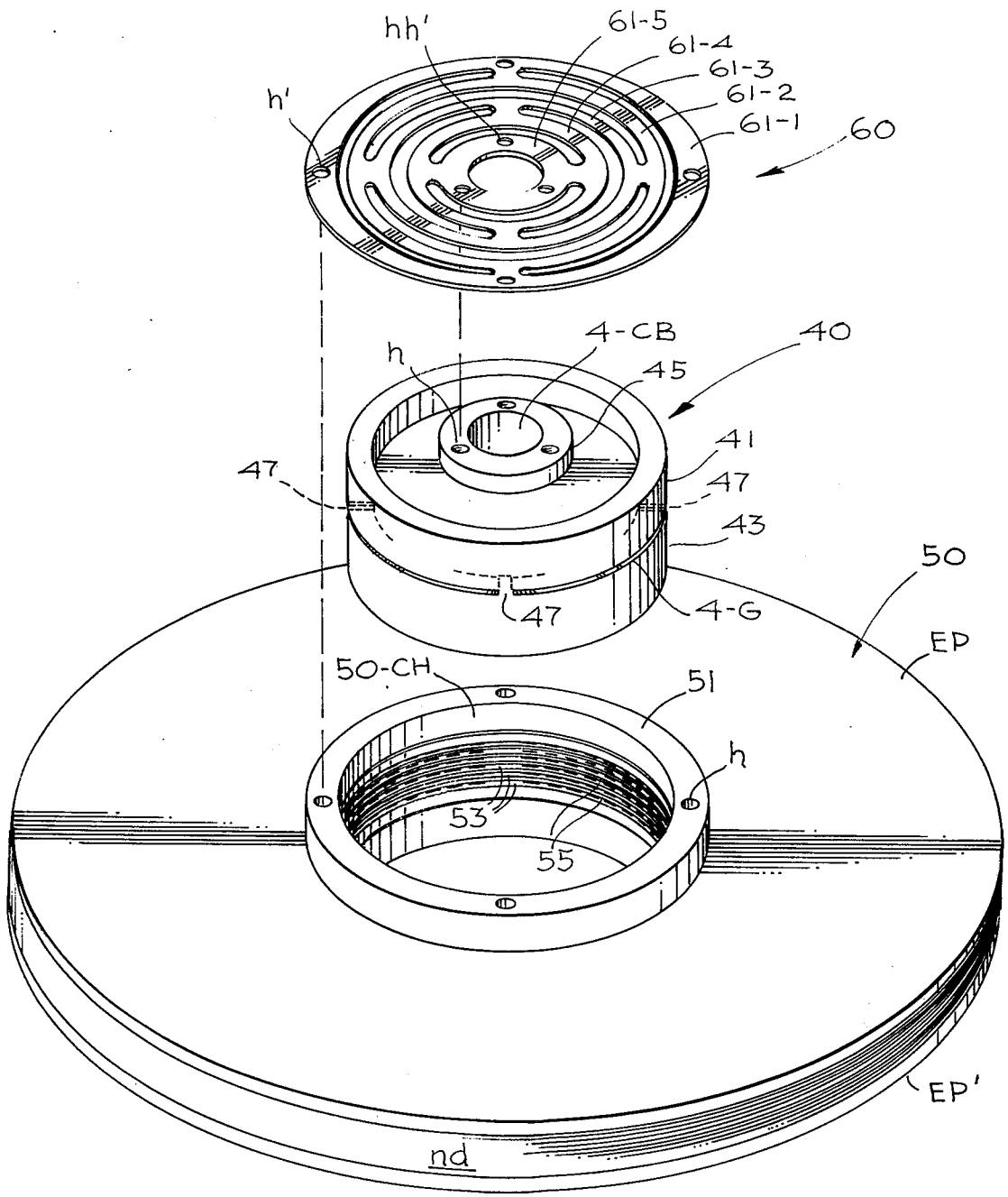
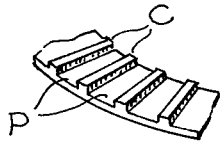
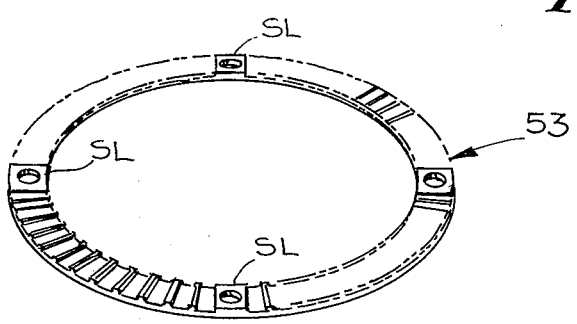
Fig. 3
Fig. 4A
Fig. 4

HIGH PERFORMANCE FLOPPY PACK AND ASSOCIATED SYSTEM

BACKGROUND OF THE INVENTION

The present invention relates to magnetic disk records for data storage and to related systems; in particular it relates to a stacked array of flexible disks and related manipulating means.

As workers in the art know, the magnetic recording arts have developed swiftly since the 1950's and 1960's when they became commercially important. Workers in the art are familiar with the features of magnetic disks used for data storage, and in particular with the advantages of "flexible", or "floppy", disks. "Floppies" became commercially significant in the 1970's, offering a low cost medium, with acceptable "access time" (e.g., as opposed to magnetic tape systems).

"Flexible disks" can serve as a "unit record" medium that is compact, light, and is readily transported, stored, and handled, interchangeably with other like disks — reasons why they are now widely used in the data processing arts. Thus, workers recognize that costs may be reduced in many cases by replacing a rigid magnetic recording disk with a "floppy" disk.

Floppy disks can be fashioned from well-known polyester sheet material (e.g., the familar polyethylene terephthalate used for magnetic tape) with a magnetic coating thereon — this plastic being simply cut into the shape of a circular disk with a central mounting hole to accommodate the familiar drive-spindle. Such a "prior art" floppy disk is well known to workers and is shown and described in U.S. Ser. No. 711,647 filed Aug. 4, 1976, now U.S. Pat. No. 4,086,640, and hereby incorporated herein by reference to the extent relevant.

The present invention is directed toward improving the design of a pack of such flexible magnetic disks, as collected into a "floppy pack" and rotated at high rpm — e.g., so that automatic pneumatic partition means may be employed to split the pack and expose any selected disk surface for Read/Write operations. An improved "floppy disk pack" according to the invention will be seen as particularly adapted for such partitioning — using surprisingly simple means and methods, as described hereinafter.

Prior efforts with flexible disks:

Workers are familiar with prior approaches to the design and manufacture of floppy disks and to related equipment for handling them. Several are described in U.S. Ser. No. 711,647, now U.S. Pat. No. 4,086,640.

Workers are aware that for many floppy disk pack applications, it is of paramount importance to minimize pack cost while yet maintaining accurate, reliable operation. Thus, it is desirable to fabricate disk pack elements from commonly available, inexpensive means. It is particularly desirable to simplify the containment elements (e.g., end plates, spacers, and retainer means). The invention teaches this, and other techniques, using surprisingly simple, commonly-available expedients. For example, with the invention a set of disks may be stacked with a simple perforate spacer between each disk and a "flexible plate" at either end to produce a floppy pack affording the "pneumatic-partition" characteristics mentioned. Using a prescribed partitioning pack-hub, such a pack will exhibit such desired advantages as "self-pumping", "bistable selection-stability", "self-flattening", self-alignment, etc.

According to a further feature, such a flexible disk pack arrangement is also adapted for pneumatic selection using a very simple centrally-apertured hollow cylinder, one that is axially translateable and is coupled to the pack with a simple, novel flexure-hub centering coupling. Workers who appreciate the remarkable character of "floppy packs" in general will best appreciate these features and their surprising effectiveness, despite their surprising simplicity and unexpected versatility. For instance, it was quite unexpected that with pack elements so-simplified, one could nonetheless select any disk surface and partition with such high speed and fine precision, and yet readily maintain disk stability, even as-diverted.

The present invention is directed toward providing improved multi-disk record units which are better adapted to meet the foregoing problems and objectives in a manner satisfying minimum-cost objectives. The invention maintains the convenience of packaging a number of floppy disks in a convenient unit record file ("pack"), while prescribing improved simplified techniques for fabricating the pack.

There are other advantages to using flexible disk files; for instance, they may be operated to be "self-flattening". That is, unlike a rigid disk, a flexible disk which is spun fast enough will, of itself, flatten-out beautifully, correcting any static warp, etc. Flexible disks can also be "self-aligning". Where spindle misalignment (axis relative to a rigid disk plane) is usually a critical problem with rigid disks — producing troublesome "runout" effects and adding to the complexity and cost of the disk drive (cost of bearings, correction means, etc.) — it is usually not problematical for flexible disks. This is because centrifugal forces created by spinning a flexible disk at high rpm tend to correct any such misalignment. This makes it relatively easy and inexpensive to manufacture a flexible disk pack and the associated drive mechanism, as workers well know. According to a feature hereof, a pair of end plates are taught as comprising a simple stack of contiguous flexible disks which is "self-flattening".

Partitioning a "floppy pack"; prior art:

Workers have become greatly concerned over how to efficiently "partition" a stack of flexible disks; that is, how to displace and/or deflect the pack away from a selected disk surface to provide clearance for entry and manipulation of a transducer assembly. For instance, a "sliding piston" arrangement is disclosed in U.S. Pat. No. 3,130,393 to Gutterman. Gutterman uses externally pressurized air to "slide" the disks apart in a "forced piston" motion. However, most workers agree that a floppy disk file responds rather poorly to such partitioning forces.

In a related pneumatically-driven approach (see U.S. Pat. No. 3,618,055 to Van Acker and U.S. Pat. No. 3,509,533 to Krijan), air is pumped from "slotted spindle" into the stack. Along this line, some workers (e.g., see U.S. Pat. No. 3,867,723 to Penfold et al.) have felt that a radially-outward flow of pressurized air between adjacent disks had a stabilizing effect, especially when the flow is uniform about the pack circumference; accordingly, they have proposed providing apertured, or perforate, spacers between the stacked flexible disks to accommodate such an air flow.

For instance, in U.S. Pat. No. 3,969,767 to Griffiths et al. "spacer-washers" are proposed to separate disks in a disk file. Each "washer" is flexible and has a set of circumferentially-spaced axial projections serving to define ports for the exit of air radially from a central duct, the outward flow passing between adjacent flexible record disks which the spacers support. Such washers are further proposed as including an inner seat and made resilient to allow them to be clamped together and engaged for absorbing and controlling the forces holding the disk pack together. Such an array can be visualized as a laminated tubular "perforate-washer spindle", the semi-rigid washers being stacked to form an air-permeable spindle for coaxially supporting the pack.

The "disk location means" contemplated by workers for partition systems have involved a mechanical or optical referencing system. The mechanical system references the nominal position of each disk in the pack to a related fixed reference scale; the optical system employs a television type scan and means for continually "counting" disk position from a reference point in the pack. Both approaches are unduly complicated and troublesome. The present invention involves a departure from these approaches, using central-source pneumatic partitioning, providing a "pneumatic slotted hub" within the disk pack and shifting it axially to partition the pack. One may either position-reference the transducer mount relative to such hub movement or, preferably, hold the mount axially-fixed and partition widely enough to accommodate a large set of adjacent disks.

Fluid dynamics of disk partitioning:

It has been found that so using a "hollow-hub" supplying pressurized air between disks in a floppy pack, disturbance of nominal pneumatic forces between "stable" disks can serve to control volumetric air flow between the disks. That is with inter-disk air flow equal, the disks tend to stabilize in equidistant relation; whereas selectively increasing air flow between a particular disk pair will tend to thrust that pair further apart. Also, interrupting such a radially-outward air flow between disks tends to pull them together and hold them somewhat compressed.

In light of such observations, and as a principle feature, the instant invention teaches providing a stack of flexible disks with a certain rigid apertured spacer between each disk, together with a central pneumatic separator-hub arrangement and an associated transducer mount. This hub is preferably cylindrical, hollow and axially translateable, with a transverse gap intermediate its length — the gap adapted to generate the desired radial "air-jet" between selected disks for "partitioning". Such a "jet hub" is thus adapted to be accurately translated along the inner hollow axis of the mentioned stack and to be selectively positioned so as to direct this partitioning air jet to displace any two adjacent disks.

Moreover, according to this feature, it has been found that such an arrangement can "pump" its own air flow and establish such a partitioning-jet without need for any separate pumping means. It can also direct the jet between a selected disk pair to quickly and accurately move down the pack, "toggling" disks from one bistable condition to another (e.g., "flat" to "divert-up" to "divert-down") — all conditions being stably held until upset by a new positive force. Such an arrangement has been found to offer considerable advantsges where rapid, reliable separation is required at high disk rpm, especially for relatively thick packs (e.g., several hundred disks).

Workers contemplating such flexible disk packs have also been concerned over the problems of transducer/disk engagement. Now, at the high disk rpm contemplated with the invention, the head must be "flown" over a disk surface (as opposed to "contact recording" which is feasible only at lower disk velocities"). Now while a single flexible disk can nicely conform to the configuration of a flying head, a stack of them cannot easily do so. Workers recognize that (unlike rigid media) a flexible disk will be compliant to head engagement, but that this compliance will vary with the number of subjecent disks (under the selected disk surface). Thus, as described below an arrangement has been found that gives the described partitioning as well as accommodating an air-film between all disks, continually, for separation thereof — these being adapted to accommodate relatively low disk/head engagement forces (e.g., up to about 10 grams). Surprisingly, and fortunately, the use of such transducer arrangements with such flexible disk media has been found to closely approximate the operation of magnetic tape systems and to afford similar advantages, such as relatively long life for the head and media.

As mentioned, the flexible disk packs and associated manipulating mechanisms according to the invention are particularly apt for "high speed" systems. Such "high speed" systems will be better understood from the parameters recited herein (e.g., see Table I below, by way of example, but not limitation).

Thus, the invention may be generally understood as involving an improved pack of flexible recording disks held in a prescribed stack between air-permeable spacers and adapted to be partitioned pneumatically with central hollow cylinder means directing an air jet radially out through a prescribed registering "crenelated" spacer, the spacer location corresponding to the desired inter-disk partition desired.

In a preferred form, a stack of magnetic recording memory disks is assembled with each separated by a "crenelated" (see below) spacer rings, the array clamped between resilient end plates to comprise a pack adapted to be mounted upon a turntable in operative relation with a central partitioning cylinder. This cylinder is resiliently coupled to the pack, preferably through adjustable centering hub-flexure means, and adapted to be thrust axially and "self-returned".

The (usually partial) partitioning effected by this pneumatic assembly is such as to admit entry of a prescribed transducer mount which is adapted to further deflect the disk pack and complete partitioning, while carrying magnetic transducer means into operative contact with the selected disk surface.

This transducer mount may enter the pack along a single prescribed plane, or, instead, be axially positionable to register with the plane of the selected disk, the partitioning means accommodating either mode. For example, it may divert the pack about one single "transducer plane" no matter which disk is selected.

In particular it will be seen that the embodiments including a novel arrangement of end plates which are made flexible and "self-flattening", preferably comprised of stacked contiguous "floppy disks". The spacers preferably comprise "crenelated washers" allowing a certain partitioning radial air flow. According to certain other related features the pack is resiliently coupled to the pneumatic-partitioning cylinder and its associated positioning means and is adapted to resiliently engage transducer mounts and associated magnetic transducer means. Workers will contrast such an arrangement with prior art designs such as those shown in U.S. Pat. No. 3,969,767 to Griffiths, et al. where, for instance, a disk pack is contained between rigid end plates and a different spacer arrangement.

The foregoing and other features, objects and advantages according to this invention will be more fully appreciated and become more apparent upon consideration of the following description of preferred embodiments taken in conjunction with the attached drawings, wherein like reference indicia denote like elements.

BRIEF DESCRIPTION OF THE DRAWINGS

FIG. 1 is a rather schematic elevation showing a simplified disk pack embodiment type in operative relation with rotation means, partition means and transducer means; while

FIG. 3 is an upper perspective of a similar pack embodiment with a related partitioning cylinder and associated flexible coupling, shown exploded-away therefrom;

FIG. 4 is an upper perspective of a preferred form of spacer adapted for use with such embodiments; this spacer shown in fragmentary elevation in FIG. 4A;

Figure 1:
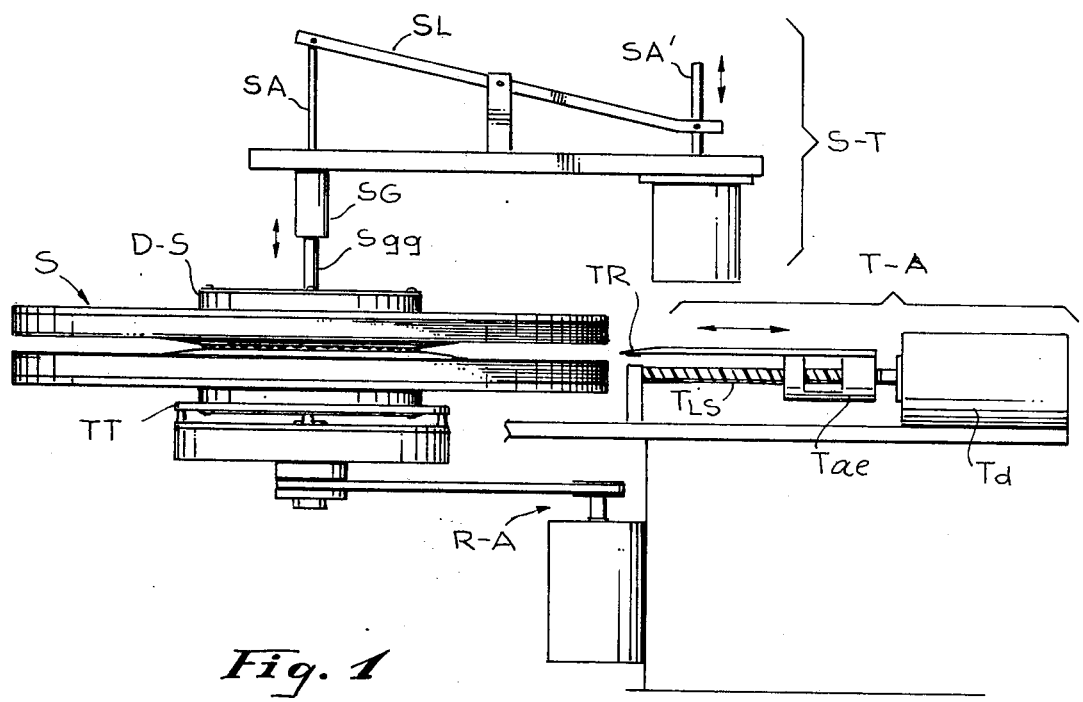
Figure 5:
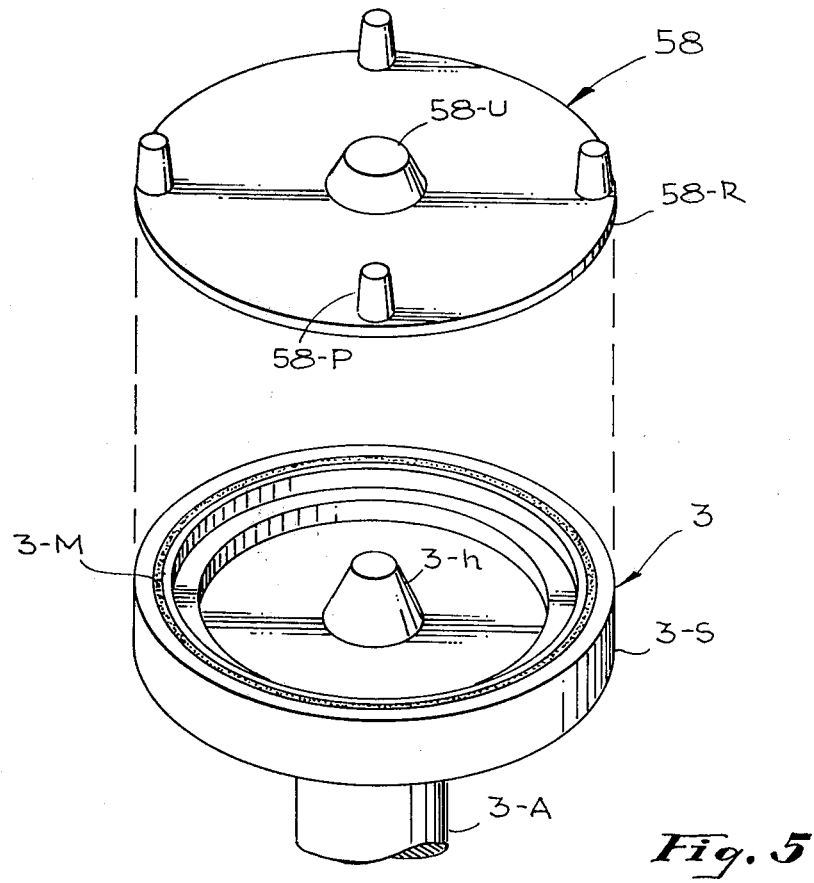
FIG. 5 is an upper elevation of an illustrative turntable, with the mating seat-portion of the foregoing embodiment shown exploded-away therefrom.

DETAILED DESCRIPTION OF PREFERRED EMBODIMENTS:

The improved disk pack embodiments described here will be understood as advantageously adapted for use in "high speed" magnetic recording systems and will be better understood from a preliminary consideration of a high-performance disk drive wherein improved flexible disk packs like these according to the invention, may be advantageously employed. Accordingly, such an arrangement is shown in FIG. 1 and described as follows:

FIG. 1: General application

FIG. 1 is a schematic, rather generalized functional showing of a flexible disk pack S mounted on a conventional turntable TT and operatively engaged with a "partitioning" hub D-S adapted to pneumatically partition the pack for access entry of a conventional transducer mount TR, as generally understood in the art. Here, and elsewhere, the materials, mechanisms and systems alluded to should be understood as conventionally constructed and operated as presently known in the art, except where otherwise mentioned.

Accordingly, an improved flexible disk pack S, (more particularly described below in connection with the particular embodiment of FIGS. 2 and 3) will be understood; one apt to be conventionally engaged by rotation assembly R for prescribed high speed rotation (the "high performance" systems like those described will be understood to involve disk rotation on the order of at least several thousand rpm). This rotation assembly comprises conventional means, schematically indicated as including a turntable TT, and an associated drive R-A, including a motor, belt coupling and associated pulleys and gears etc., as well understood in the art.

Once pack S is so engaged and so rotated, it is ready for transducer operations on a selected disk, access to which (by transducer TR, as known in the art) is best facilitated by a "partitioning", i.e., a separation between disks sufficient to expose the selected disk surface, at least partly, so as to accommodate entry of the transducer mount. Here, and elsewhere, it will be indicated that flexible disk packs like those described, are particularly apt for "pneumatic" partitioning from a central source partitioning hub D-S, which generates a partitioning jet.

As further described below in some detail (with respect to the embodiment of FIGS. 2 and 3), hub D-S comprises a hollow cylinder adapted to be inserted and axially thrust down by precision actuation arrangement S-T, into the hollow center of the disk pack — the axial position of D-S determining where stack S is partitioned. This is detailed below (see FIGS. 2, 3). Suitable hub positioning systems, for very precisely injecting such a cylinder into a disk pack and re-positioning it very quickly and accurately will be contemplated and understood by those skilled in the art and need not be depicted or detailed here.

The positioning-actuate system is conventional, and thus merely indicated schematically in FIG. 1 by assembly S-A comprising a linear actuator SAA (e.g., solenoid driven) adapted to controllably thrust a related arm S-A' along a prescribed path (preferably incrementally and with great precision) — "return" being otherwise provided (see below). Arm S-A' is coupled to a companion arm S-A, through a pivot connection, including a connecting lever SL adapted to reverse the thrust direction via arm S-A (arm S-A including an extension $S_{gg}$ coupled to hub D-S and journaled in sleeve SG). This connection linkage is thus adapted to reciprocate with great precision axially of the disks in pack S, as mentioned.

Transducer TR may be of conventional design and is part of a transducer assembly T-A adapted to reciprocate TR (as indicated by the arrow) radially into, and out of, the pack S, — preferably along a prescribed constant path, roughly midway across the axial height of the pack. This feature is highly advantageous and accommodated by the (below detailed) novel partitioning scheme — which acts to so separate the pack as to admit array TR along a single path, no matter "which disks are "split"". As workers recognize this allows one to dispense with axial servo means — a significant step forward!

The transducer and actuating means may be provided as well known in the art and need not be detailed here. Thus, transducer mount may, surprisingly, be translated along a single access path (plane), via the special partitioning features herein; alternatively it may be translated axially (e.g., "slaved" to "follow" hub displacement) to seek registry with the plane of a "selected" disk, as is conventional. Transducer/disk loading will preferably be very light (a few grams). and not sufficient to interrupt the separating air-stream (described below) between adjacent disks.

By way of example only, an actuation drive motor $T_d$ is indicated as coupled to rotate a lead screw $T_{LS}$ on which the head mounting arm is mounted, being threadably engaged therewith via arm-extension $T_{ae}$ for precise translation into the pack (e.g., to access specific tracks on a selected magnetic disk surface, as is well known in the art and need not be detailed here). As described below, workers will recognize that the heads may preferably be suspended upon compliant means adapted to advantageously interact with the air-separated flexible disks according to the invention (see discussion below of compliant head engagement with the disks, bearing upon the selected disks as well as adjacent disks and inter-disk air films, these bending in compliance therewith).

Disk pack embodiment, FIGS. 2-5:

FIG. 3 indicates a novel flexible disk pack embodiment 50 shown in exploded relation with an associated partitioning cylinder 40, and intermediate (top) "flexure-hub" coupling 60. Pack 50 is preferably a removeable cartridge type (as known in the art) and may include a surrounding protective envelope or shroud, with suitable ports for air exchange. Key elements are indicated in enlarged inter-fitting functional relation in the side-section of FIGS. 2A, 2B, where a radial-out air burst is indicated for two particular partitioning operations adapted to place transducer TR in operative engagement with an illustrative selected disk surface.

Referring now to FIGS. 2 and 3, a coaxial stack 50 of identical, commonly-supported, flexible disk records 55 will be understood as mounted and retained, along with intermediate spacers 53, between a pair of opposed flexible end plates, EP, EP', being clamped between collars 51, 51' according to one feature hereof. Disks 55 are spaced apart a prescribed uniform distance with identical annular separator rings 53 which are radially-vented, or made radially "air permeable", according to another feature hereof. The array of disks and inter-disk spacers is clamped firmly between end plates EP, EP' by a pair of opposed collars 51, 51' using means known in the art (e.g., with bolts or rivets threaded through holes h in collars 51, disks 55 and spacers 53; or by like fastener means as understood by workers in the art). The inner circumferences of disks 55, of spacers 53 and of collars 51, as so stacked and clamped together, are relatively congruent to define the sides of a cylindrical center hole 50-CH of prescribed diameter and height as known in the art.

Flexible disks 55 are of a type known in the art and, as workers will appreciate, may assume various dimensions and compatible constructions. A typical flexible disk comprises a thin polyester disk substrate, usually one to several mils thick (e.g., a well-known polyethylene terephthalate a few mils thick — 1.5 mils preferred here — with a randomly oriented ferric oxide coating; disk diameter being approximately 12 inches with a center-hole about 2.5 inches in diameter). The disk will have a magnetic coating on at least one side to thus define a magnetic recording surface.

As generally indicated in FIGS. 2, and well understood in the art, the entire pack 50 is adapted for engagement with an accommodating turntable array 3; for example, through an engaging seat-fixture 58 formed with (or affixed to) the base collar 51', or otherwise as known in the art. To this end, seat 58 will include a set of projecting pillars 58-P (four, preferably) plus an associated central upset-hub portion 58-U configured to accommodate a mating spindle-hub 3-h of the turntable, as is well known in the art. Thus, pack assembly 50 is frictionally engageable upon the turntable via seating disk 58, to be held during rotation and easily removed when desired. Preferably, turntable 3-S includes a supplemental magnetic retainer, such as ring magnet 3-M inset therein, adapted to attract and (releaseably hold) metal seat 58, as well known in the art. Also, neck 51' with seating portion 58 is sufficiently high to allow the partition cylinder 40 (lower flexure 60' thereof) clearance, when gap 4-G is registered with the "bottom" spacer 53-D (for partition of recording disk 55-D). Turntable 3-S will be understood as mounted for rotation at one end of a support shaft 3-A, which is adapted to be rotated by drive means and associated coupling means as is well known in the art (not illustrated here).

End plates:

According to one feature hereof, flexible disks 55 are retained in a pack between a pair of flexible stabilizer end plates EP, EP'. These plates are adapted to have a prescribed compliance (e.g., to accommodate a "self-flattening" action of the plates under the centrifugal forces generated at the operating rpm). Such a flexible end plate is an advantageous feature and is very simple to provide; for instance, preferably comprising a plurality of contiguous flexible recording disks 55 (identical to the record disks, except that no magnetic coating is needed). Plates EP, EP' fix the pack position axially and each cooperates with a respective adjacent record disk to form a prescribed "channel" defining the intervening air flow. Thus, the plates should be quite flat and are so rendered by centrifugal forces. For instance, in one embodiment, with pack comprising from 200 to 300 1.5 mil polyester recording disks, to be rotated at "high speed", satisfactory end plates comprise about 60 identical 1.5 mil polyester disks held together contiguously in a laminar array. Ordinarily, the indicated clamping — pressing metal spacers against flexible disk material — will be adequate to hold the relative position of disks and spacers between end plates. Workers will appreciate the unique advantages of such flexible end plates — such as their "self-flattening" character — especially as compared with conventional rigid end plates of prior art design, such as those shown in Griffiths, et al. U.S. Pat. No. 3,969,767.

With such a convenient construction the number (thickness) of flexible disks joined to form an end plate (by any suitable clamping or adhesive means) will serve to establish the proper degree of stiffness — being sufficiently stiff to hold the pack together (i.e., limit the bending flexure of diverted disks without, itself bending, thus keeping disks from whirling and flopping about); yet flexible enough to be self-flattening under contemplated operating conditions. Preferably, the end plates are fabricated to exhibit the same width (ID and OD) as the recording disks held between them. Workers will recognize the saving over metal plates that is realized (e.g., since metal plates must be finished and also mounted to render the necessary flatness and spindle-alignment — not being "self-flattening" or "self-aligning"). Other related flexible material may be used to construct such flexible end plates as appreciated by workers in the art.

Figure 2A:
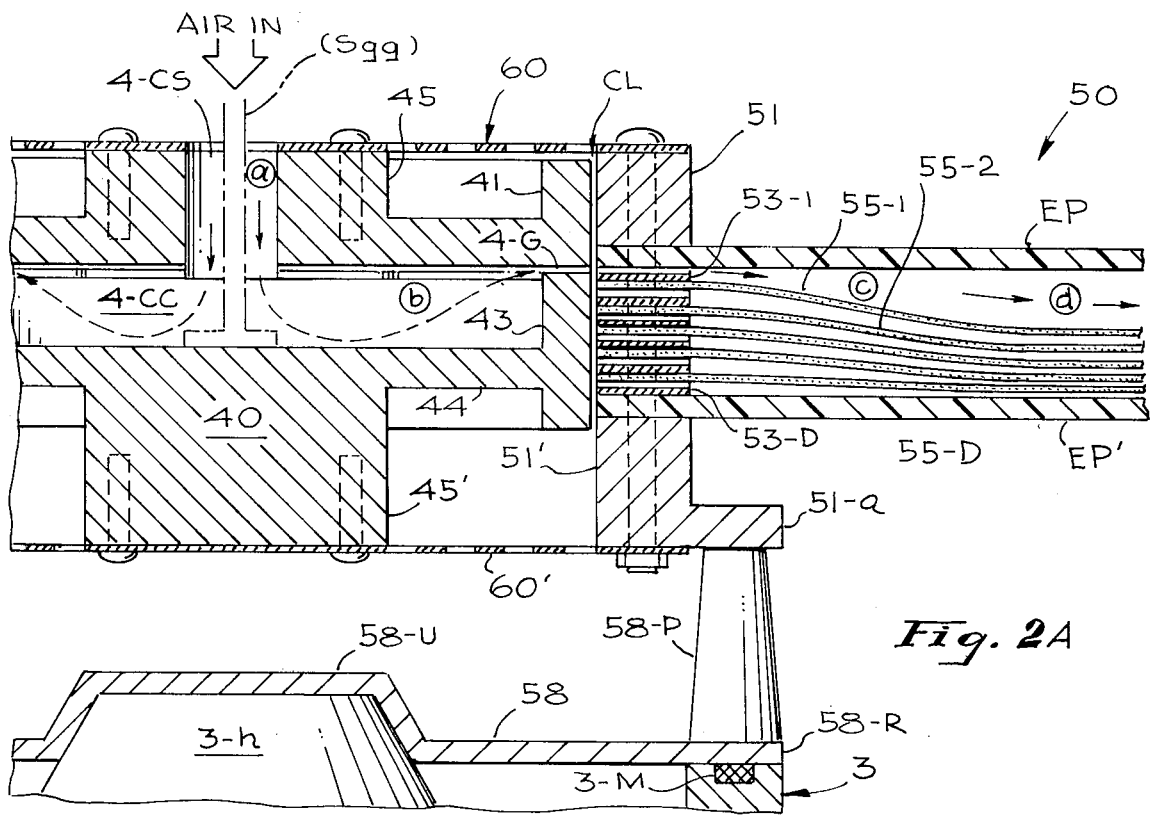
FIG. 2A is a side sectional showing of a particular disk pack embodiment shown in operative relation with partitioning means and FIG. 2B shows the same in another illustrative partitioning condition.

Spacers:

According to another feature, recording disks 55 are separated by annular "crenelated" (vented) spacer rings, 53, better illustrated in FIGS. 4 and 4A, and functionally indicated in FIGS. 2. Spacers 53 will be understood as identical, serving to maintain disks axially spaced 55 a prescribed uniform separation distance (here, about 10 to 20 mils preferably). The spacers are unilaterally "crenelated"; (i.e., they are cut-out on one side, through their upper cross-section as shown for this embodiment) and are perforated relatively uniformly to leave relatively identical radial ridges spaced regularly about the ring's circumference — thereby accommodating a centrifugal air flow [radially-out from within the pack center 50-CH as for instance, indicated adjacent "selected" disk 55-1 in FIG. 2A]. Other forms of spacers which are "crenelated", or otherwise "radially-vented", will occur to workers in the art.

In a preferred embodiment, spacers 53 each comprise a thin ring of stainless steel, or like rigid material which is flat on one side and is "crenelated" on the other, thus maximizing radial air flow and minimizing pneumatic impedance. Thus, consistent with maintaining a light acceptable pressure on the adjacent disk surface [for a given ring width], this maximizes the percentage cross-sectional area of the "ports" formed (between crenels).
—One-sided (unilateral) "crenelation" (vs. both sides) is preferred therefore. That is, bilateral (or "two-sided crenelation") is disfavored because it results in a higher total wall area defining the ports (vs. "one-sided crenelation" for the same total port area) — thus unnecessarily increasing the heat and turbulence (lost energy) and required pumping energy for a given thru-flow.

More particularly, vented ring spacers 53 help to maintain recording disks 55 normally separated and lubricated by a thin film of air, as well as serving, during special partition times, to pass the partitioning air jet issuing from slit 4-G. Workers will recognize that such pneumatic separation depends upon the clearance dimension CL between the outer side walls of cylinder 40 and the inner walls of pack centerhole 50-CH as indicated in FIG. 2. If this clearance is not above a certain minimum, a vacuum will result between disks 55, pulling them together; whereas if it is too large the air-flow between disks may agitate them.

Preferably, and as indicated in FIGS. 4 and 4A, separators 53 are relatively rigid and "crenelated" on one side (see crenels c separated by ducts or ports p) with the other side relatively flat. Such a "unilateral crenelation" is preferred to a "bilateral crenelation", where both sides of the spacer are cut-out, given the same "total port area" (cross-sectional area summed up between all ports $p$). Such unilateral crenelation will minimize the total surface area defining ports $p$, thus maximizing the percent cross-section devoted to ports and minimizing the associated impedance and lost energy due to turbulence, heat, etc., generated as the wall area increases. Accordingly, unilateral crenelation will, for a given total air flow, minimize the pumping energy necessary and maximize the throughput volume of partitioning air.

For the embodiments of FIGS. 2, 3 a "crenelated spacer" of the following type is quite suitable: 0.5 inch wide stainless steel ring with 2.5 inches ID; 3.0 inches OD and about 25 mils thick (15–30); the ports ($p$) (see FIG. 4A) being etched away to a uniform 4° width (arc width, or about 0.1–0.2 inch) by 4–6 mil high; except for four wider perforate crenels (SL) accommodating fastener holes. Spacer height is chosen to determine record spacing, while crenel height (and spacing) is selected to govern radial air flow [between record disks; for both spacing air-film and for the partitioning air bursts — see below]. Other rigid ring materials may be used as workers will recognize. Four enlarged crenels, or fastener sites SL, are provided equidistant about the ring 53 and apertured to accommodate the mentioned fastener means extending between the top and bottom collars 51, 51' of pack 50 (see FIG. 3).

For added security, the recording disks may be adhesively secured to these ring spacers and/or via serrations or other frictional coupling means, provided as known in the art. The clamping forces between spacers and disks should usually be sufficient to secure the disks against relative rotation or radial creep etc., as known in the art.

In summary, improved disk pack assemblies as above-described exhibit advantageous spacer means, end plate means, and turntable coupling means with evident features of advantage, implement for various applications as workers can visualize. One particularly suitable application is with a certain "partition-hub" arrangement and related accessories as now described.

Use and operation of disk pack; partition-hub:

Workers in the art will recognize that novel, flexible disk packs such as those above described may be constructed in various ways and adapted for various advantageous applications. Such packs will be recognized as particularly apt for use with interior "pneumatic partitioning" means, such as with the hollow cylinder partitioning means 40 described herein as resiliently coupled to such a pack. For this reason it will be useful to further consider the construction and operation of such a hollow partitioning cylinder.

As generally described above (see FIG. 1, FIGS. 2, 3) partitioning hub, or cylinder 40, is adapted to direct a diskparting air jet radially-outward through a disk pack like those described (including vented spacers) and will be understood as comprising a pair of cross-sectionally-congruent cylinders 41, 43, separated at their mid-section (by thin radial spacers 47) to generate an intermediate air jet slit 4-G in pneumatic communication with the hollow center bore 4-CS formed when the cylinders are joined together as illustrated. Preferably, hub 40 also includes an upper extension 45 adapted to couple the hub to upper flexure means, such as hub-flexure 60, and a lower extension 45 similarly coupled to lower flexure 60'.

Cylinder 40 thus preferably comprises a pair of similar, axially-hollow, hubs 41, 43 joined via radial spacer ribs 47 (four understood, set equidistant about the center) at their periphery to define an interior cavity and an intermediate jet-orifice or circumferential gap 4-G of prescribed height (about the same as spacers 53, or a bit less — lest partition turbulence, inefficiency etc. result). A common central cylindrical cavity, or bore 4-CS penetrates the top hub 41 and communicates with the larger (diameter) bore 4-CC in lower hub 43, bore 4-CC being closed at its distal (bottom) face 44, (see FIG. 2). The diameter of bore 4-CS is sufficient to admit and entrain a prescribed air-flow, under contemplated operating conditions [e.g., record disks become self-pumping at several thousand rpm] and communicates via companion bore 4-CC with slit 4-G; [see arrows; flow $a$ to $b$ to $c$]. Slit 4-G will be understood as forming a flow constriction such as to pressurize and direct the radial-out air flow, accelerating it for partitioning. Also, a filter could readily be mounted atop lower hub 43 to clean-up the air stream before entering cavity 4-CC.

Preferably, the gap 4-G is positioned so that, when the partition cylinder is mounted in a disk pack, gap 4-G lies registered (for partitioning) with the closest spacer (see upper-most spacer 53-1, FIG. 2A). And a prescribed linear actuator means (e.g., see actuator arm $S_{gg}$ disposed concentrically in cavity 4-CS to thrust base 44, FIG. 2) will be understood as provided to "step" cylinder 40 axially down the pack bore 50-CH, so as to controllably and selectably translate jet-orifice 4-G into registry with any selected spacer 53, terminating at the "distal" spacer 53-D.

The hub flexures 60, 60' will serve to "return" hub 40 to its original "REST" condition (FIG. 2A), preferably; though workers will recognize that other return means may be substituted (e.g., with a reciprocal actuator).

Flexure coupling:

A preferred accessory to this illustrative partitioning arrangement flexibly couples hub 40 to be centered with pack 50 by flexure means, such as the "flexure-hubs" 60, 60' serving to locate hub 40, and keep it precisely concentric with the pack while also returning it from axial actuation. Such a coupling can thus serve to maintain a relatively uniform circumferential clearance CL (see also FIG. 2) between hub 40 and pack 50 — something important to disk separation, as mentioned below.

Thus, using oversized connector holes $h'$, or other means well known in the art, hub 40 (neck 4-CS thereof, with screw holes $hh$ therein, adapted to register with holes $hh'$ of coupling 60) is centered with, and removeably attached to, pack 50. Bottom flexure 60' is identical and likewise connected between hub 40 (at neck 45') and pack 50. The attachment means (e.g., oversized screw slots shown) is adapted to allow adjusting the radial position of hub 40 relative to pack 50 (in center-bore 50-CH) so as to maintain the mentioned narrow uniform clearance CL therebetween. This clearance will typically be extremely narrow (on the order of a few mils; preferably about 5 mils with the indicated embodiment); to pass only a minor stream of air down the center-hole, and then radially out through all spacers — this stream being "sucked into" clearance CL by inter-disk under-pressure. Once it has passed through (all) the perforate spacers, this stream serves to generate a prescribed thin film of pressurized air which can keep each record disk pneumatically separated from its neighbors. Pack rotation and resultant centrifugal forces will induce the flexible records to "pump" this "separating flow" into the array as workers can visualize. Such pneumatic-isolation can keep TR loading ("tape-like") from inducing deleterious disk contact.

Now, centering is very important since this separating flow must be circumferentially uniform; also hub 40 must reciprocate freely and unimpeded along bore 50-CH. That is, when hub 40 is actuated for partitioning and begins to be thrust down center-hole 50-CH, (or when it returns) it must never engage the pack (center-hole side walls) lest gap 4-G be mis-positioned and induce an erroneous partition. Of course, a rigid coupling could provide some position adjustment, but it could not readily be made to accommodate such precise axial reciprocation and not provide actuation-return. Accordingly, coupling 60 is preferably made transversely, symmetrically flexible, in the form of the indicated "hub-flexure" according to this feature.

More particularly, couplings 60, 60' (top and bottom) each comprises a series of concentric radially-connected rings of flexible material: namely, (for illustrative upper coupling 60, FIG. 3) an inner ring 61-5 which is surrounded, successively, by first, second, third and fourth concentric spaced flexure rings: i.e., rings 61-4, 61-3, 61-2 and 61-1, respectively; each ring spaced a prescribed radial distance from its neighbor and joined thereto through a plurality of symmetrically-disposed, radial "lands". Outer ring 61-1 is perforated with four screw holes $h'$ adapted to register with holes $h$ on collar 51, for attachment thereto with screws, bolts or the like. The innermost ring 61-5 is similarly provided with coupling apertures $hh'$ (preferably oversized to allow radial position-adjust) adapted to register with screw holes $hh$ on neck 45 to receive common screws. Workers will understand how these coupling holes are made oversized, etc., so as to permit the mentioned centering adjustment of the position of hub 40 so as to be exactly concentric with center-hole 50-CH of pack 50 — or this may instead be effected by other means well known by workers in the art.

Preferably, when coupling 60 is attached to partition cylinder 40, the cylinder will assume a "rest-position" relative to (disk 55) in pack 50, preferably such as to present slit 4-G registered with the "uppermost" partitioning interface, i.e., opposite spacer 53-1 in FIG. 2 and between the uppermost recording disk 55-1 and the adjacent flexible end-plate EP. In this "rest-condition", gap 4-G will be thus positioned at its "proximate" (inactuated) partitioning position, closest to upper flexure coupling 60. Thus, the actuation means ($S_{gg}$ in FIG. 2) for hub 40 need only execute a unidirectional excursion axially of pack 50 to thrust hub 40 and gap 4-G ever further into the pack, scanning past all partitioning positions — flexure couplings 60, 60' acting as "return springs" when the actuation force is released and actuator arm $S_{gg}$ is retracted.

Workers will recognize the advantages of accommodating such a "unidirectional" actuation thrust means and the use of the centering flexure couplings as a return spring. For example, a pack of about 200 three-mil × 12 inch record disks, separated by 25 mil spacers will form a pack close to 5.6 inch high × 12 inch in diameter. With two 0.18 inch thick end plates (formed by sixty three-mil record disks pressed together), the pack height is raised to about 6 inches, with a center hole diameter of about 2½ inches. For such an array, a partition cylinder of close of 2½ inch (diameter) × 4 inch (high) is suggestive, having an axial excursion of close to six inches. For this, and longer, hub excursions the indicated hub-flexure should be replaced with a more compliant coupling (e.g., helical coil).

Partitioning operation:

In general, partitioning will be understood as effected by direction of pressurized air flow through cylinder 40 to exit through a spacer 53 at the selected axial location. In this operation (particularized below) it will be understood that, with partition cylinder 40 seated in accommodating center hole 50-CH of pack 50 and resiliently coupled to the pack (preferably through flexure-couplings 60, 60' see FIG. 2), partitioning at the selected inter-disk site is effected by thrusting cylinder 40 axially of the pack (indicated by the reciprocal arrowhead in FIG. 2). "Partitioning" will, in general, be understood as involving a "splitting" or division of the disk pack so as to be separated into two or more sections.

More particularly, air is sucked through the center-bore 4-CS of hub 40 (upper annulus 41 thereof) which serves as an air duct concentric with the hub's cylindrical axis, bore 4-CS communicating with the transverse jet orifice 4-G intermediate the hub length. Bore 4-CS, as will be detailed below, is in pneumatic communication with a supply of partitioning gas. Preferably this constitutes ambient air which is drawn-in by the "self-pumping" records 55 under high speed rotation. Alternatively a forced-air supply may be used, though this is usually not necessary. In some cases (e.g., under low-pressure — e.g., high altitude — conditions) supplemental pump and/or compressor means will be used with, or in lieu of, the described arrangement. For instance, workers will readily see how a multi-vane impeller-compressor could readily be mounted atop annulus 41, together with a multi-duct diverting plate (adapted to direct a jet stream radially of hub 40 — possibly eliminating the need for cavity 4-CC in lower annulus 43) and serve to "boost" the pressure of the emitted jet stream. The so injected air exists from bore 4-CS and cavity 4-CC centrifugally, through slit 4-G and relatively uniformly about its circumference, to be projected as a pressurized jet-stream through a registered disk spacer 53.

An illustrative partitioning sequence will now be recited for clarification purposes — referring to the showings in FIGS. 2.

Preliminary assumptions:

It will be assumed that pack 50 is engaged atop turntable 3 and rotated thereby at operational speed. This will, in turn, co-rotate flexible coupling 60 and partitioning cylinder 40 with pack 50. Actuator arm $S_{gg}$ will be understood as exerting no significant frictional force on hub 40 (base 44 thereof contacted) lest it retard disk rotation. Hub 40 will be recognized as thus held in precise coaxial centered relation with pack 50, maintaining the narrow clearance CL necessary. Initially, the partition assembly (cylinder 40, flexure 60 and arm $S_{gg}$) will be in "Rest" condition with gap 4-G registered with spacer 53-1 (as shown in FIG. 2A) and prepared to begin a partitioning sequence. Also transducer mount TR will be assumed retracted and out of engagement with pack 50 (as shown in FIG. 1, and FIG. 2A). It will be further assumed that the transducer gap of mount TR is to be operatively engaged with the upper-side of disk 55-3 (see FIG. 2B — although double-sided transducing is readily feasible too) — this determining the partitioning sequence that is to be invoked.

Now, it will also be assumed, for this embodiment, that the transducer array is preferably (though not necessarily) fixed axially of pack 50 i.e., need not be "servo-ed" up and down the pack seeking head-registry with the plane of a "selected" disk surface. Incidentally, workers will quickly recognize the enormous benefits of eliminating this servo — typically necessary though quite complex and costly! Now some minor difficulties may arise, but they are not insoluble; for instance, if disks touch (e.g., when rotation ceases) so as to induce some magnetic "print-through", (switching) separator disks, or "herringbone recording" or like expedients may be required. Also, since the drop-distance of (one or both) magnetic heads will vary somewhat and shift their relative radial distance from center according to which disk is engaged, some compensating means may be required (e.g., a known "track-on-data" scheme allowing the head to fine-position itself via track position signals picked off the record itself and fed back to control the linear-actuate servo).

With these assumptions the partitioning-transducing operations would proceed generally as follows:

Step 1

"Rest" condition; record separation and self-alignment; partition at 53-1: Once the pack and hub are rotating, ambient air will have been pumped out from between the record disks by centrifugal force, thus creating an underpressure there as a source of suction radially from center-hole 50-CH via perforate spacers 53 — this serving to draw ambient air into gap CL and center bore 4-CS. Also, disks 55 will have been "self-flattened" and "self-aligned", by the high speed rotation.

This suction will draw a thin pressurized air stream from all spacers 53 and out between all disks, tending to keep them uniformly separated, slightly. (See air-stream shown as pulled into bore 4-CS, along shaft $S_{gg}$, and, deflected by base 44 to exit hub 40 through slit 4-G — following arrows (a), (b), (c), in order). This air-stream flow depends upon the magnitude of: the interdisk vacuum, the spacer port, (area), the clearance CL and the rotational speed, as workers will appreciate. Thus, reducing radial clearance CL (e.g., with shims on hub 40, etc.) will tend to increase the velocity and decrease the cross-sectional thickness of the separating jet-streams between disks 55.

Now, since this "Rest condition" registers slit 4-G with spacer 53-1 and establishes a partition jet stream issuing therefrom, this stream will pass through (the ports of) spacer 53-1 (as detailed below) to open a partition gap between disk 55-1 and end plate EP, as illustrated in FIG. 2A.

Step 2:

Jet shift to impact 53-3, partition there: Hub 40 is next thrust down in pack 50 enough to register slit 4-G with spacer 53-3 and effect a new "selected" partition as indicated in FIG. 2B.

More particularly, a memory stage in an associated control unit stores the address (location) of all disk surfaces. This is accessed for the address of the "selected" spacer 53-3 and generates a "partition-control" pulse which is applied to control partition actuator arrangement S-A (FIG. 1), causing it to thrust arm $S_{gg}$ down against cylinder 40 (base 44 thereof) just enough to translate gap 4-G into registry with spacer 53-3 — the spacer defining the inter-disk gap associated with this selection and related partition.

Figure 2B:
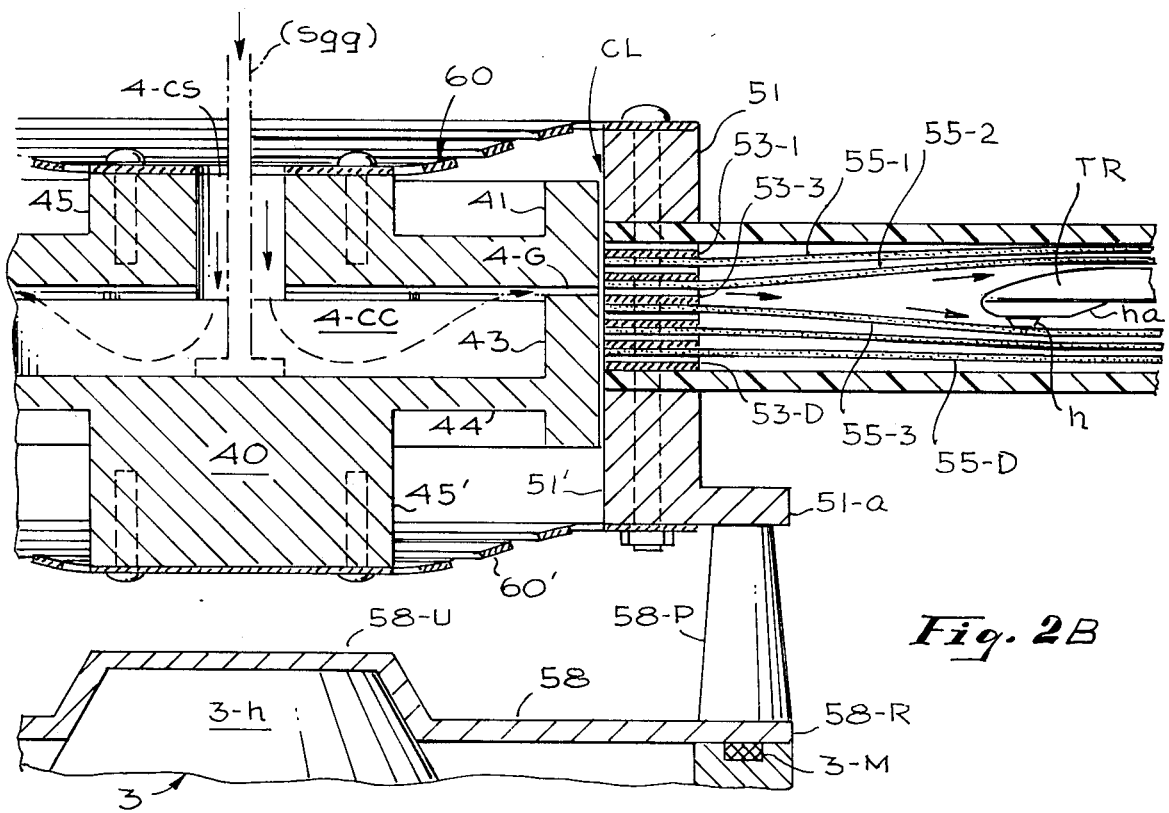

When cylinder 40 is so translated downwardly, an associated distortion is, of course, induced in flexure couplings 60, 60' so they assume the "bent" condition indicated in FIG. 2B. [Note: only one flexure may be so used, but may lead to some "non-centered travel" of hub 40, as workers will realize]. This pressurized partitioning air-burst is sucked into bore 4-CS from the inter-disk vacuum via spacer 53-3, thus being indicated as entering at locus "a" in FIG. 2B, then projected, pressurized, out through slit 4-G as indicated at locus "b". The high-pressure partitioning stream proceeds circumferentially uniform through spacer 53-3, to deflect flanking disks 55-2, 55-3 diversingly, thrusting them apart in symmetrical divergence (see locus "d") as indicated functionally in FIG. 2B. The pneumatic force of this air stream will be made sufficient to so thrust disks 55-2, 55-3 apart, sufficient to admit entry of the distal end of transducer mount TR unobstructed between disks 55-2 and 55-3; whereupon it may further deflect them as required.

Step 3

Transducer entry at 53-3:

With a (partial) partition thus effected pneumatically, the transducer ("nose") may now enter between disks 55-2, 55-3 to complete the partition with further upward thrust of the engaged ("upper") pack, while the nose of this transducer arm is thrust further into the pack seeking the target data-track on the (continually-rotating) selected disk (FIG. 2B).

Transducer mount TR will continue radially-inward to engage the underside of selected disk surface 55-2, with the recording transducer being transulated-in just enough to register with a selected track. The while, the mount's end (nose) is deflecting disk 55-2 upward, along with any disks above it (here, recording disk 55-1), deflecting them away from the transducer as indicated above. It will be appreciated that such deflection really completes partitioning; thus, the pneumatic partition forces need only create an opening around the path of transducer TR, sufficient for it to make an unobstructed partial-entry.

In actual practice the transducer head will be lightly loaded (e.g., about 1 gram load) against the selected record surface, and against the balance of the pack behind it — a separating air-stream being preferably maintained between all disks at all times, to keep them apart and out of damaging, frictional contact, according to this feature. Of course, deflection will reduce the inter-disk separation (especially at disk periphery) but the intake gap CL and all spacers 53 will continue to supply the separating pressurized air-stream (as indicated in FIGS. 2A, 2B). The transducer is preferably mounted on a cantilevered flexure arrangement under a diverting shield (not shown) adapted to make the initial diverting contact with the disk pack and to effect the upward thrust mentioned.

Step 4

Transducer operations, withdrawal:

With full partitioning completed and transducer registered with the appropriate track of the "selected disk", a control means will continue to manipulate the transducer on this surface (e.g., to other disk tracks); then, finally, retract the transducer mount from the pack. This will leave the pack (partially) partitioned pneumatically until hub 40 (and its slit 4-G) "aims" a partition-jet through a different spacer. Even with the air-stream from spacer 53-3 terminated (e.g., air is cut-off to bore 4-CS, or gap 4-G is shifted), the pack will still hold to its partitioned condition, until a new partition force is applied (the so-deflected disks thus exhibiting "bistable deflectability"). Workers will recognize that such an arrangement could also be adapted to enhance access speed i.e., reduce net time between partitioning and transducer-entry.

The results achieveable with arrangements like the described embodiment will be gratifying to workers in the art; for instance, the desirable "self-flattening" of the disks and their "self-pumping" action, facilitating an effective "separating air stream" between all disks — practically at all times, even when deflected and transduced — via the "vented spacer" and associated central partitioning array — usually without need for artificial pressurization; also the flexible end plates so easy and inexpensive to fabricate, while still being dynamically "self-flattening" (i.e., under operating high-speed rotation); the "bistable" pack partition character, with disks remaining in position between successive partition-sequences, tending to remain in one partition mode unless and until a different positive partition force is impressed (facilitating a desirable "toggling" of the disks in proceeding from one partition to the next); and the "tape-like" transducer engagement made possible.

Alternate embodiments:

While the described embodiments have involved a removeable cartridge form of floppy disk pack, workers will understand that the instant invention may be used with other disk arrangements, such as an array of floppies stacked fixed along a prescribed (horizontal or vertical) axis and susceptible of central pneumatic partitioning and isolation. And here, or elsewhere, this axis may, in turn, be defined by a continuous slotted cylinder supporting the disks, and within which a pneumatic partitioning hub is translated. Also, in some cases related rigid disks, or other configurations may be similarly manipulated.

Likewise, the radially-perforate separator rings may take other functionally similar forms, the unilateral crenelations fashioned into a modified array of notchings or scalloppings or like regularly spaced projections.

Similarly, other means will be contemplated for providing the partitioning jet from within the disk stack, so that a high velocity gas stream is projected (e.g., via a valved nozzle) under pressure to be directed out between selected disks. More particularly, referring to FIGS. 2 and 3, a compressor stage (of a type known to workers — not illustrated) may be inserted at the entry region of hub 40 [e.g., within bore 4-CB of neck 45] to assist, or supplant, the injection of gas into the partition system. Such a compressor could be the "whirling vane/slotted nozzle" type, driven by ambient air and/or a pressurized gas source, to compress entering gas and direct it radially-out to gap 4-G as known (e.g., like a jet-turbine arrangement).

Also, where the base of pack 50 is adapted to interfit with a conventional "spindled turntable" like 3, its annular periphery being magnetically held thereon (58-R on 3-M) removeably, other known coupling arrangements may readily be substituted.

Figure 6A:
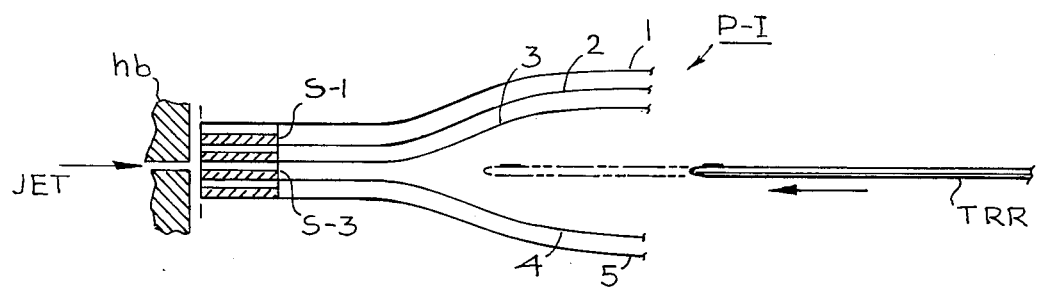
FIGS. 6A, 6B are sectional schematics indicating a modified mode of jet-partitioning, in two steps, while FIG. 7 similarly indicates another modified mode.
Figure 6B:
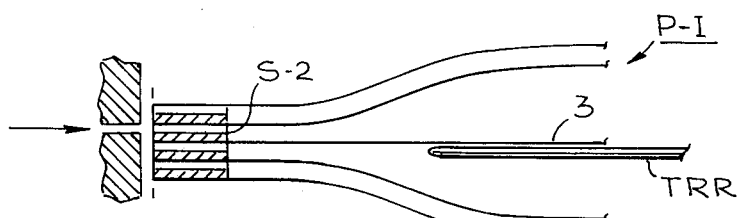
Figure 7:
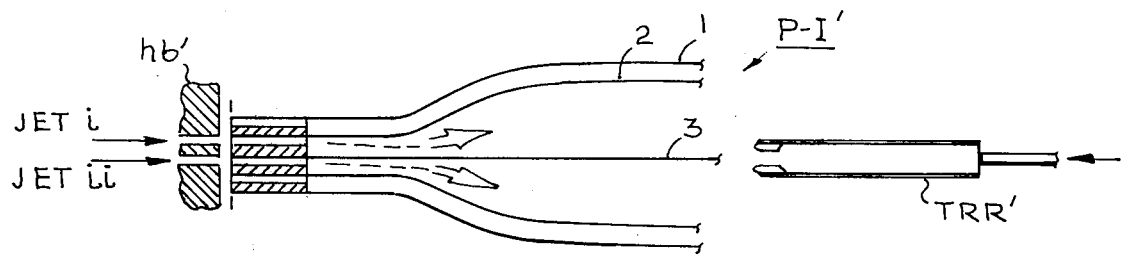

"Double-partitioning" — FIGS. 6, 7:

And, as workers can appreciate, the described pneumatic partitioning action may be implemented in various other ways. For instance, as illustrated very schematically in FIGS. 6A and 6B, the invention may be applied to effect "multiple-partitioning" (— double-partitioning, here, whereby floppy pack P-I will be understood as to be partitioned both above and below the "selected" disk #3, so as to accommodate — transducing on either or both sides of the disk — e.g., by transducer array TRR and/or another such). Here, as in FIG. 7, it will be understood that conventional elements and/or those described above are to be inferred, the figures indicating only very functionally how an exemplary "double partition" is begun (FIG. 6A) and completed (FIG. 6B).

More particularly, it will be understood that to accommodate such "double-side" access pack P-I is to be split between floppy disks #3 and #4; and then "selected" disk #3 dropped (down) to be held "centered" in the partition-gap, preferably being held so against transducer mount TRR. Thus, the partition-hub $hb$ is operated to bring its partition-jet-gap into registry with the (slotted portion of) "crenelated" spacer-ring S-3, to effect the desired "initial split" (FIG. 6A). Then transducer array TRR is thrust into the (center of) this gap, so that, when hub $hb$ is shifted (up) to register with spacer S-2, and disk #3 flipped down responsively, this disk may be pressed flat against (the transducer region of) mount TRR (FIG. 6B).

A functionally similar arrangement is similarly indicated in FIG. 7, where like hub $hb'$ is adapted to project two associated partition jets, one on each side of a "selected" disk to effect a similar "double-partition" of pack P-I'. Here, selected disk #3 will be understood as so partitioned to be centered in the gap, pneumatically, so as to receive a bifurcated transducer array TRR' on both sides. It will be understood that, with this arrangement, it will be important to "balance" the jet-streams through each spacer so as to impart relatively equal, opposed forces to hold the selected disk so centered.

Workers may visualize the means necessary to provide this (not illustrated).

Workers in the art will recognize many features of advantage and surprising novel utility deriving from device design and construction along the described lines. They will recognize that using such designs, pack cost may be minimized, especially where the end plates are manufactured from a stacked array of the floppy disks themselves, and wherein a simple radially-vented spacer array may be manufactured and conveniently used, being inserted between disks, and clamped in place between simple collar means.

Such a pack will be readily adapted for advantageous interaction with central pneumatic hub means of the type described, wherein the natural centrifugal pumping action of the pack under high speed rotation assists in establishing a stable air film-separation of disks, while also assisting in pneumatic partitioning.

It will be surprising to workers how stable, and bistable, the disk array will be (both "as quiescent" and "as partitioned"). The versatile, fast, simple partition control it enables (e.g., with simple partition-hub translation) will be appreciated, especially since it facilitates a partition which is almost entirely pneumatic, with no mechanical friction evident (e.g., no sliding of one metal surface across another). The described characteristics of "self-flattening", "self-pumping" and easy-centering will be seen to facilitate a novel advantageous partitioning action whereby a transducer mount array may enter and operate more easily (e.g., translated along a single track (plane), without need for axially translating the array and registering it with a disk or ascertaining disk location means as above described) — this being a massive advantage over today's arrangements. The desirable "pneumatic separation" of each disk using such simple means will provide obvious features of advantage evident to workers in the art.

It will be particularly pleasant, while surprising, for workers to contemplate a pack of flexible disks that are adapted to engage a transducer array with a lighter, more uniform load despite the large number of disks in (the diverted portion of) the pack; such an array accommodating relatively low head/disk engagement forces (on the order of just a few grams) with little transverse compliance. Indeed, operation as described more closely approximates magnetic tape systems, with their associated long-lived head and media, than any comparable disk packs, and this is both surprising and gratifying.

Applications for improved disk pack:

The flexible disk packs and associated manipulation means contemplated herein will be understood by workers in the art to have special utility for certain "high performance" applications. One example of such a high performance application is summarized in Table I (only by way of illustration and without limitation) involving a high speed system (several thousand rpm; vs. "low speed" systems operated at several hundred rpm); especially apt for embodiments like those in FIGS. 2-7:

TABLE I

| High Performance Disk Drive System (Illustrative) | |
| --- | --- |
| Pack Size | Variable (with 25 : 12" disks .5 × 11 × 11") |
| Disk Size (Diameter) | 8–14 inches |
| Tracks Per Disk Surface | 200 – 600 |
| Track Density | 100 – 200 |
| Number of Disks | 20 to several hundred contemplated |

TABLE I-continued

| High Performance Disk Drive System (Illustrative) | |
| --- | --- |
| Data Capacity, M B | 20 - several thousand (unformatted, "single-side" or "double-side" record) |
| Rotation Speed, RPM | Several thousand |
| Access Time: | |
| Average Per Disk, MS | 60 (Suggestive) |
| Average Disk to Disk, MS | 520 (Suggestive) |

Finally:

It will be appreciated that novel flexible disk pack arrangements and techniques, as here described in the indicated, and other related recording systems, may be advantageously employed in various ways. Such arrangements will be seen as especially advantageous in conjunction with a "pneumatic-partitioning" arrangement as described.

The above description has been concerned with the manner in which a transducer mount may be better operated relative to a stack of flexible disks without need for translating the mount axially (of the stack — in the usual case). As pointed-out, a conventional magnetic disk system with which the invention may be employed may alternatively employ one or several such transducer mounts, each located for operation and selective positioning with respect to a different set of disks — and made axially shiftable or not. It will be understood that the positioning of each such head mount relative to associated disks may be provided in the same manner described herein or otherwise, as is known.

It will be understood that the preferred embodiments described herein are only exemplary and that they are susceptible of many modifications and variations in construction, arrangement and use, without departing from the spirit of the invention. For example, it has been assumed that "central pneumatic means" are necessary for (at least partly) partitioning the pack — however, while this is preferable, facilitating quick partitioning and a simplified transducer mount, other related means may be employed. In certain instances, with the disks adequately spaced by the "separating air stream", partitioning can be helped by means applied from outside the pack.

Further modifications of the invention are also possible. For example, the means and methods disclosed herein are also applicable with different central pneumatic partition means. Also, the present invention is applicable for use with various other actuating and/or positioning means for a partition hub.

The above examples of possible variations of the present invention are merely illustrative. Accordingly, the present invention is to be considered as including all possible modifications and variations coming within the scope of the invention as defined by the appended claims.

What is claimed is:

1. In combination, a pneumatically partitionable "floppy pack" and pneumatic partition means:
said pack comprising a plurality of flexible recording disks and intermediate radially-vented, rigid separator means, both being arranged to form a co-rotatable stack with a center-bore of prescribed length and diameter;
the separator means serving to separate the disks from one another a prescribed uniform distance;
the pack so-formed being adapted for disk separation and partition by said partition means disposed in the center-bore, each partition means being arranged and adapted to direct at least one pressurized jet stream between selected disk surfaces, through the associated separator means therebetween, so as to deflect flanking disks and thus partition the stack;

said partition means also being flexibly coupled to said pack for precisely-aligned, adjustably-centered reciprocation up and down said bore whereby to precisely control the partition-selection.

2. A partitionable disk pack storage system comprising in combination:

a pneumatically partitionable "floppy pack" comprising a plurality of flexible magnetic recording disks and intermediate radially-vented separator means, both being arranged to form a co-rotatable stack, with a center-bore of prescribed length and diameter;

the separator means serving to separate the disks from one another a prescribed uniform distance;

each disk containing at least one recording surface, the disks being spaced uniformly along the rotation axis by said intermediate radially-vented separator means;

pack rotation means for rotating said stack at relatively high rpm;

central pneumatic partitioning means disposed in the center-bore and adapted to project one or more jets, each radially-out through a selected one of said spacer means to thus partition the stack by deflecting the flanking disks there; and transducing means adapted to be selectably translated into the partition gap, and arranged and controlled to perform transducing operations upon one or two of the disk surfaces exposed by the partition;

the partitioning means being coupled to the pack through flexible connector means arranged and adapted to accommodate actuation of the partition means in one direction down said bore, while urging return thereof, the while serving to accommodate the relative centering of said partition means in said bore and the maintainence of the centered disposition.

* * * * *

UNITED STATES PATENT OFFICE
CERTIFICATE OF CORRECTION

Patent No. 4,118,746              Dated October 3, 1978

Inventor(s) Herbert U. Ragle and Ko Ko Gyi

It is certified that error appears in the above-identified patent and that said Letters Patent are hereby corrected as shown below:

Col. 3, line 62, change "advantsges" to —advantages—.
Col. 4, line 9, change "subjecent" to —subjacent—.
Col. 8, line 65, between "center" and "50-CH" insert —hole—.
Col. 9, line 23, change "centerhole" to —center-hole—.
Col. 10, line 21, change "diskparting" to —disk-parting—;
        line 43, change "FIG." to —FIGS.—.
Col. 12, line 30, change "of", second occurrence, to —to—.
Col. 13, line 1, change "soinjected" to —so-injected—.
Col. 14, line 63, change "transulated-in" to —translated-in—.

Signed and Sealed this

Sixteenth Day of January 1979

[SEAL]

Attest:

RUTH C. MASON
Attesting Officer

DONALD W. BANNER
Commissioner of Patents and Trademarks